United States Patent [19]

Honda et al.

[11] Patent Number: 5,446,125
[45] Date of Patent: Aug. 29, 1995

[54] METHOD FOR REMOVING METAL IMPURITIES FROM RESIST COMPONENTS

[75] Inventors: Kenji Honda; Edward A. Fitzgerald, both of Barrington, both of R.I.; Lawrence Ferreira, Fall River, Mass.

[73] Assignee: OCG Microelectronic Materials, Inc., West Paterson, N.J.

[21] Appl. No.: 753,488

[22] Filed: Sep. 3, 1991

Related U.S. Application Data

[63] Continuation-in-part of Ser. No. 678,399, Apr. 1, 1991, abandoned.

[51] Int. Cl.$^6$ .............................................. C08F 6/08
[52] U.S. Cl. ................................... 528/486; 528/486; 521/28; 430/190; 430/191; 430/192
[58] Field of Search .................. 430/190, 191, 192; 521/28; 528/482, 486; 210/660, 688, 502.1, 773

[56] References Cited

U.S. PATENT DOCUMENTS

| | | | |
|---|---|---|---|
| 3,067,172 | 12/1962 | Carlstrom | 528/482 |
| 3,509,084 | 4/1970 | Anspon et al. | 528/482 |
| 4,033,909 | 7/1977 | Papa | 260/2.5 F |
| 4,070,313 | 1/1978 | Papa | 528/482 |
| 4,518,760 | 5/1985 | Smith et al. | 528/48 |
| 4,537,937 | 8/1985 | Cawlfield et al. | 525/417 |
| 4,871,779 | 10/1989 | Killat Et al. | 521/28 |
| 4,965,167 | 10/1990 | Salamy | 430/191 |

FOREIGN PATENT DOCUMENTS

| | | | |
|---|---|---|---|
| 3217564 | 11/1983 | Germany | C08G 64/46 |
| 57074370 | 5/1982 | Japan . | |
| 1228560 | 9/1989 | Japan . | |

*Primary Examiner*—Joseph L. Schofer
*Assistant Examiner*—Richard Jones
*Attorney, Agent, or Firm*—William A. Simons

[57] ABSTRACT

A method of removing metal impurities from a resist component, comprising the steps of:
  (a) dissolving said resist component in a solvent;
  (b) contacting said resist component solution with a cation exchange resin and a chelate resin for a sufficient amount of time to absorb at least a portion of said metal impurities onto said cation exchange and chelate resins; and
  (c) separating said cation exchange and chelate resins bearing said metal impurities from said resist component solution.

21 Claims, No Drawings

METHOD FOR REMOVING METAL IMPURITIES FROM RESIST COMPONENTS

CROSS-REFERENCE TO RELATED APPLICATION

This application is a Continuation-In-Part Application of U.S. patent application Ser. No. 07/678,399, filed on Apr. 1, 1991, with Kenji Honda, Edward A. Fitzgerald, and Lawrence Ferreira as named co-inventors, now abandoned.

BACKGROUND OF THE INVENTION

1. Field of the Invention

This invention relates to a method for removing metal impurities from resist components. In particular, this invention relates to a method for removing metal impurities (including sodium, iron, calcium, chromium, copper, nickel, and zinc) from a resist component or resist composition solution by contacting that solution with a cation exchange resin and a chelate resin.

2. Brief Description of Prior Art

Photoresist compositions are used in microlithographic processes for making miniaturized electronic components such as in the fabrication of integrated circuits and printed wiring board circuitry. Generally, in these processes, a thin coating or film of a photoresist composition is first applied to a substrate material, such as silicon wafers used for making integrated circuits or aluminum or copper plates of printed wiring boards. The coated substrate is then baked to evaporate any solvent in the photoresist composition and to fix the coating onto the substrate. The baked coated surface of the substrate is next subjected to an image-wise exposure of radiation. This radiation exposure causes a chemical transformation in the exposed areas of the coated surface. Visible light, ultraviolet (UV) light, electron beam, and X-ray radiant energy are radiation types commonly used today in microlithographic processes. After this image-wise exposure, the coated substrate is treated with a developer solution to dissolve and remove either the radiation-exposed or the unexposed areas of the coated surface of the substrate.

There are two types of photoresist compositions—negative-working and positive-working. Both negative-working and positive-working compositions are generally made up of a film-forming resin and a photoactive compound dissolved in a suitable casting solvent. Additives may be added for specific functions. When negative-working photoresist compositions are exposed image-wise to radiation, the areas of the resist composition exposed to the radiation becomes less soluble to a developer solution (e.g., a cross-linking reaction occurs) while the unexposed areas of the photoresist coating remain relatively soluble to a developing solution. Thus, treatment of an exposed negative-working resist with a developer solution causes removal of the nonexposed areas of the resist coating and the creation of a negative image in the photoresist coating; and thereby uncovering a desired portion of the underlying substrate surface on which the photoresist composition was deposited. On the other hand, when positive-working photoresist compositions are exposed image-wise to radiation, those areas of the resist composition exposed to the radiation become more soluble to the developer solution (e.g., a rearrangement reaction occurs) while those areas not exposed remain relatively insoluble to the developer solution. Thus, treatment of an exposed positive-working resist with the developer solution causes removal of the exposed areas of the resist coating and the creation of a positive image in the photoresist coating. Again, a desired portion of the underlying substrate surface is uncovered.

After this development operation, the now partially unprotected substrate may be treated with a substrate etchant solution, plasma gases, or the like. This etchant solution or plasma gases etch the portion of the substrate where the photoresist coating was removed during development. The areas of the substrate where the photoresist coating still remains are protected and, thus, an etched pattern is created in the substrate material which corresponds to the photomask used for the image-wise exposure of the radiation. Later, the remaining areas of the photoresist coating may be removed during a stripping operation, leaving a clean etched substrate surface. In some instances, it is desirable to heat treat the remaining resist layer after the development step and before the etching step to increase its adhesion to the underlying substrate and its resistance to etching solutions.

Positive-working photoresist compositions are currently favored over negative-working resists because the former generally have better resolution capabilities and pattern transfer characteristics. Preferred positive-working photoresist today generally involve novolak resins and o-quinonediazide photoactive compounds dissolved in a suitable solvent.

Impurity levels in photoresist compositions are becoming an increasingly important concern. Impurity contamination, especially by metals, of photoresists may cause deterioration of the semiconductor devices made with said photoresists, thus shortening these devices' lives.

Impurity levels in photoresist compositions have been and are currently controlled by (1) choosing materials for photoresist composition which meet strict impurity level specifications and (2) carefully controlling the photoresist formulation and processing parameters to avoid the introduction of impurities into the photoresist composition. As photoresist applications become more advanced, tighter impurity specifications must be made.

In the case of novolak resin materials used for making positive photoresists, such novolak resins have been subjected to distillation or crystallization purification operations in order to remove impurities, especially metals. However, such operations have deficiencies. One, they are time-consuming and costly. More importantly, they do not remove impurities down to the very low levels now needed for advanced applications (i.e, in low parts per billion maximum levels).

Alternatively, ion exchange resins have been used for novolak impurities. One general technique is to pass an impure novolak resin solution through a particulate cation exchange resin (e.g., AMBERLYST styrene-divinyl benzene cation exchange resin). However, such treatments have several problems associated with it including the following:

1. The cation exchange resin treatment of the novolak may decrease the pH of the novolak-containing solution, possibly causing serious corrosion of metal containers in which the purified novolak-containing solution may be stored.
2. The purified novolak may have a decreased rate of dissolution during the development step of the photoresist which may be caused by the undesired adsorption of the lower molecular weight portion of novolak resin onto the cation exchange resin.

3. Alkali metals such as sodium and potassium are easily removed with conventional particulate cation exchange resins. However, divalent or trivalent metal cations (e.g., $Cu^{+2}$, $Ni^{+2}$, $Zn^{+2}$, $Fe^{+2}$, $Fe^{+3}$ $Ca^{+2}$, or $Cr^{+3}$ ions) may have a lower affinity to conventional cation exchange resins. Iron and other easily oxidizable metals cannot be completely removed because they may be colloidal metal hydroxides or oxides. Such colloidals are not significantly removed by cation exchange resin treatment.

4. Ion exchange resin, particularly a strong acid-type of cation exchange resin, decomposes resist components which contain or use solvents containing hydrolyzable groups such as esters. For example, ethyl lactate is decomposed by AMBERLYST A-15 to form polylactite moieties, which may degrade lithography performance of photoresists. As used herein, that term "polylactide" is defined as a polymeric or oligomeric product of a lactide, a cyclic dimer of lactic acid which is formed by hydrolysis of ethyl lactate.

In addition to the standard cation exchange resin treatment of the novolak resin, it is known to subject complete photoresist compositions (e.g., novolak resin, photosensitizer, and solvent) to both cation and anion exchange resin treatment. For example, Japanese Patent Publication (Kokai) No. 57-74370 discloses a method of reducing impurities in resists by using cation exchange resins and anion exchange resins in separate and a successive manner. Japanese Patent Publication (Kokai) No. 01-228,560, which was published on Sep. 12, 1989, teaches that the metal impurities content in photosensitive resin solutions or photoresist compositions may be reduced with a mixture of a cation and anion exchange resins. However, these techniques have the deficiency of not removing divalent and trivalent metal impurities and may decompose resist components or solvents containing resist components. Usually, such cation and anion exchange resins have been washed with a solvent such as deionized water or the same solvent in which the resist component is already dissolved in. However, such washings with water or solvents will not clean the resins of pre-attached metal impurities because metal ions such as sodium or potassium as well as other acidic contaminants strongly bind to the anionically charged groups of cation exchange resins.

Accordingly, there is still a need in the photoresist art for improved methods of removing metal impurities from novolak resins and other materials used as photoresist components. The present invention is a solution to that need.

BRIEF SUMMARY OF THE INVENTION

Therefore, one embodiment of the present invention is directed to a method of removing metal impurities from a resist component comprising the steps of:
 (a) dissolving said resist component in a solvent;
 (b) contacting said resist component solution with a cation exchange resin and a chelate resin for a sufficient amount of time to adsorb at least a portion of said metal impurities onto said cation exchange and chelate resins; and
 (c) separating said cation exchange and chelate resins bearing said metal impurities from said resist component solution.

A preferred embodiment of the present invention is directed to a method of removing metal impurities from a resist component, comprising the steps of:
 (a) dissolving said resist component in a solvent;
 (b) contacting said resist component solution with a cation exchange resin and a chelate resin, for a sufficient amount of time to absorb at least a portion of said metal impurities onto said cation exchange resin and said chelate resin; said cation exchange resin and, optionally said chelate resin, having been prewashed with quaternary ammonium salt solution; and
 (c) separating said cation exchange and chelate resins bearing said metal impurities from said resist component solution.

DETAILED DESCRIPTION

The term "resist component" as used in the present specification and claims includes alkali-soluble resins such as novolak resins and polyvinyl phenol resins, photoactive compounds as well as their precursors, and additives (e.g., speed enhancers, dyes, and the like) conventionally employed in photoresist compositions. This term also includes precursor compounds for making such components. Examples of such precursor compounds would be backbone compounds for making photoactive compounds as well as the precursor photoactive ester compounds (e.g., naphthaquinone diazide sulfonyl chlorides).

The term "novolak resin" as used herein refers to any novolak resin which will dissolve completely in an alkaline developing solution conventionally used with positive-working photoresist composition. Suitable novolak resins include phenol-formaldehyde novolak resins, cresol-formaldehyde novolak resins, xylenol-formaldehyde novolak resins, cresol-xylenol-formaldehyde novolak resins, preferably having a molecular weight of about 500 to about 40,000, and more preferably from about 800 to 20,000. These novolak resins are preferably prepared by the addition-condensation polymerization of a phenolic monomer or monomers (e.g., phenol, cresols, xylenols, or mixtures of such monomers) with an aldehyde source such as formaldehyde and are characterized by being light-stable, water-insoluble, alkali-soluble, and film-forming. One preferred class of novolak resins is formed by the condensation polymerization between a mixture of meta- and para-cresols with formaldehyde having a molecular weight of about 1,000 to about 10,000. Illustrative preparations of novolak resins are disclosed in U.S. Pat. Nos. 4,377,631; 4,529,682; and 4,587,196, all of which issued to Medhat Toukhy and are incorporated herein by reference in their entireties.

Other preferred novolak resins are illustrated in U.S. patent application Ser. Nos. 07/405,802 and 07/713,891 which were filed by Charles Ebersole on Sep. 8, 1989 and Jun. 12, 1991, respectively. Their disclosures are also incorporated herein by reference in their entireties.

The term "photoactive compounds" as employed in the present specification and claims may include any conventional photoactive compound commonly used in photoresist compositions. Quinonediazide compounds are one preferred class of compounds with naphthoquinone diazide compounds a preferred class of species in that generic class. As mentioned above, photoactive compound precursors may be treated according to the present invention. One photoactive compound precursor which has been treated according to this method is 2,6-bis(2,3,4-trihydroxyphenyl)methylene-4-methyl phenol (also known as 7-PyOL) which is described in Example 3 of U.S. Pat. No. 4,992,356.

Photoresist additives may be treated according to the present invention. Such additives may include speed enhancers, dyes, and the like. One preferred speed enhancer is 1-[(1'-methyl-1'-(4'-hydroxyphenyl)ethyl)]4-[1',1'-bis-(4-hydoxyphenyl)ethyl]benzene (also known as TRISP-PA).

In the first step of the present process, the resist component is dissolved in a solvent or solvent mixture to facilitate the contacting of the resist component with the cationic exchange resin and the chelate resin. Examples of suitable solvents include acetone, methoxyacetoxy propane, ethyl cellosolve acetate, n-butyl acetate, ethyl lactate, ethyl-3-ethoxy propionate, propylene glycol, alkyl ether acetate, or mixtures thereof and the like. Cosolvents such as xylene or n-butyl acetate may also be used. One preferred solvent is a mixture of ethyl lactate and ethyl-3-ethoxy propionate wherein the weight ratio of ethyl lactate to ethyl-3-ethoxy propionate is from about 30:70 to about 80:20.

The solids contents of the resultant resist component solution is not critical. Preferably, the amount of solvent or solvents may be from about 50% to about 500%, or higher, by weight; more preferably from about 75% to about 400% by weight; based on the resist component weight.

While it is preferred to use a single resist component as the material being treated by the method of the present process, it is contemplated within the scope of the present invention that combinations of resist components may be treated. For example, it may be desirable to treat a complete positive-working photoresist formulation (e.g., a combination of a novolak resin or resins, a photoactive compound such as quinonediazide sensitizer, and solvent or solvents as well as conventional optional minor ingredients such as dyes, speed enhancers, surfactants, and the like) according to the method of the present invention.

The metal impurities in the resist component solution may be in the form of monovalent metal cations such as alkali metals (e.g., $Na^+$ and $K^+$) as well as divalent or trivalent cations (e.g., $Ca^{+2}$, $Fe^{+2}$, $Fe^{+3}$, $Cr^{+3}$, or $Zn^{+2}$). Such metal impurities may also be in the form of collidal particles such as insoluble colloidal iron hydroxides and oxides. Such metal impurities may come from the chemical precursors for the resist component (e.g., for novolak resins these may be phenolic monomers and aldehyde sources) as well as in the solvent used to make the solution. These impurities may also come from the catalysts used to make the resist components or from the equipment used for their synthesis or storage. Generally, the amount of metal impurities in a resist component such as a novolak resin prior to the present inventive process is the range from 500 ppb–5,000 ppb, or greater, by weight for metals such as sodium and iron. Sodium impurities are generally in the form of monovalent ions ($Na^+$). The iron impurities are in the form of divalent and trivalent species ($Fe^{+2}$ and $Fe^{+3}$) as well as insoluble colloidal iron species (e.g., iron hydroxides and oxides).

The resist component solutions may be made in any conventional method of mixing a resist component with a solvent. Generally, it is preferred that the resist component is added to a sufficient amount of solvent so that the resist component is dissolved in the solvent. This step may be facilitated by agitation or other conventional mixing means.

The next step in the process of the present invention is contacting the resist component solution with at least one chelate resin and at least one cation exchange resin.

Chelate resins which may be useful for the present invention include any and all chelate resins capable of removing metals from the resist component as well as being compatible with the resist component, solvent, and cation exchange resin employed. Examples of suitable chelate resins may include iminodicarboxylic acid-derivatized poly(chloromethyl styrene), 2,5-dihydroxyterephthalaldehyde-diamine Schiff polyacrylates and polyhydroxamic acid derivatized from polyacrylate and hydroxylamine, beta-diketonic polymers, polyphosphoric acids, polyamines, and the like. One preferred chelate resins is DOWEX A-1 available from Dow Chemical Company of Midland, Mich. This is an iminodicarboxylic acid type of resin.

Another preferred chelate resin is DIANION CR-20 produced by Mitsubishi Kasei of Tokyo, Japan. This chelate resin is a cross-linked styrene-divinyl benzene copolymer resin having polyamine functional chelating groups in the copolymer and has an average 1.2 micron particle diameter.

It has been found that addition of chelating resins having polyamine chelating groups to a resist component increases the pH of the resulting mixture (e.g., from about 3.5 to about 5–6 depending on the proportion of the amount of the chelating resin added). This pH increase unexpectedly causes the formation of a hydroxide complex with the ferric or other polyvalent metal ion impurities. These hydroxide complexes precipitate out of solution and then may be removed by conventional separation means (e.g., microfiltration). The treatment with the polyamine-type chelate resin will generally return the resist component solution to its original pH level since treatment with a cation exchange resin may decrease the pH of resist component solution. Thus, unwanted corrosion and other unwanted effects associated with highly acidic material will be avoided.

Cation exchange resins which may be useful for the present invention include any and all cation exchange resins which are able to remove metals from resist components and are compatible with the resist component, solvent, and chelate resin employed. Suitable cation exchange resins include phenol sulfonate-formaldehyde condensates, phenol-benzaldehyde sulfonate condensates, styrene sulfonic acid-divinyl benzene copolymers, methacrylic acid-divinyl benzene copolymers, methacrylic acid-divinyl benzene copolymers, and other types of sulfonic or carboxylic acid group-containing polymers. One preferred particulate cation exchange resin is AMBERLYST 15 available from Rohm and Haas of Philadelphia, Pa. This is a styrene sulfonic acid-divinyl benzene copolymer.

Besides particulate cation exchange resins, fibrous cation exchange resins may also be used. The term "fibrous" is used herein to describe ion exchange resins, particularly cationic exchange resins which are made up of fibrous material, as opposed to particulate material. Such fibrous material may be in the shape of fibers, sheets, strings, fine fibrels and fine films. The fibrous resin may be made from an organic ion exchange resin material such as polystyrene, polyphenols, polyvinyl alcohol, polyacrylate, polyesters and polyamides which have ion exchange groups introduced onto such resins. The introduced ion exchange groups may include cationic exchange groups such as sulfonic acid, phosphoric acid, carboxylic acid and iminodiacetic acid. The fibrous ion exchange resin may also be composed of mixtures of the above-mentioned ion exchange resin materials in combination with non ion-exchange resins or fibrous material such as polyolefin resins, acrylonitrile polymers and copolymers and cellulose acetate. Generally, the fibrous ion-exchange resins are made of fibers which are about 1–500 mm, preferably 10–100 mm, in diameter and about 0.1–100 mm, preferably 0.50–50 mm, in length. Preferred fibrous cationic exchange resins are TIN-100 and TIN-600, available from Toray Industries, Ltd. of Tokyo, Japan. TIN-100 is a polystyrene/polyolefin composite fiber having sulfonic acid exchange groups introduced onto the polystyrene resin. TIN-600 is a polystyrene/polyolefin resin having iminodiacetic acid exchange groups introduced onto the polystyrene. Both TIN-100 and TIN-600 have a fiber diameter of 40 microns and a fiber length of 0.5 mm. These fibrous ion exchange resins have excellent absorptive power and large surface area as well as having good chemical and heat resistance.

The relative amounts of chelate resin and cation exchange resin employed in this process are preferably from about 1% to about 10% by weight, based on the resist component solution. More preferably, these relative amounts are from about 2% to about 4% by weight, based on said solution.

The weight ratio of chelate resin to cation exchange resin employed in the present process is generally from about 9:1 to about 1:9, more preferably from about 75:25 to about 25:75 and most preferably about 1:1.

As stated above, a separate embodiment of the present invention is the pretreatment or prewashing of the cation exchange resin and, optionally the chelate resin, with a quaternary ammonium salt solution. It has been found that said quaternary ammonium cations enhance the ion exchange reaction between a prewashed cation exchange resin or chelate resin and the resist component without having an adverse lowering of the pH of the treated resist component.

It is also believed that the anions in quaternary ammonium salt compounds, particularly hydroxides, can extract the cationic counter ion (e.g., $H^+$ or $Na^+$) of the cation exchange resin so that the bulky quaternary ammonium cation thus becomes the counter ion on the cation exchange resin. This replacement of the $H^+$ or $Na^+$ cation counter ion with the bulky quaternary ammonium cation counter ion results in a higher efficiency of metal ion reduction and retards the hydrolysis of resist components or solvents containing said resist components.

Quaternary ammonium salt compound may include tetramethylammonium hydroxide (TMAH), although it is believed other tetra-alkyl ammonium hydroxides as well as other classes of quaternary ammonium salts would be suitable for the present process. Other quaternary ammonium cations may include tetraethylammonium, methyltriethanolammonium, and benzylmethyldiethanolammonium.

The most preferred quaternary ammonium salt compounds are polymeric quaternary ammonium compounds. These may include hexamethrine, poly(vinylbenzyltrimethylammonium) chloride, polyimidazoline, and quaternized poly(vinylpyridine).

Polymeric quaternary ammonium compounds are preferred because of the stronger immobilization of a polymeric quaternary ammonium cation to an anionic group of cation exchange resin as compared to a monomeric quaternary ammonium cation.

The quaternary ammonium salt is contacted to the ion exchange resin in the form of a solution, most preferably, an aqueous solution. The amount of ammonium salt in solution is generally from about 1% to about 50% by weight of the solution.

The amount of quaternary ammonium salt compound employed should be in excess to the weight of the cation exchange and chelate resins being treated. Generally, the amounts of quaternary ammonium salt employed is from about 150% to 1,000% or higher, by weight of cation exchange and chelate resin.

The mode of prewashing may be any method conventionally used to wash cation exchange and chelate resins with water or organic solvents. One preferred method is to add the resins to a large weight excess of an aqueous solution containing 2–30% by weight the quaternary ammonium salt solution and stirring the resulting suspension for 20–40 minutes at room temperature, followed by decanting the quaternary ammonium salt solution. This stirring and decanting may be repeated 3–5 times. Thus, the washed resins may be further washed with the same solvent which will be used in contacting step (b) in order to preswell the cation exchange and chelate resins.

The contacting of the resist component solution with the chelate resin and cation exchange resin may be a simultaneous or sequential operation. If simultaneous, the contacting with the chelate resin and cation exchange resin will occur at the same time. If sequential, the resist component will be contacted first with either the chelate resin or cation exchange resin and then contacted with the other resin. In any case, the amount of time for each contacting should be sufficient to absorb at least a portion (preferably, at least a major portion (at least 50%) by weight and, more preferably, at least 90% by weight) of the metal impurities present in the resist component solution.

There are four preferred modes of this contacting step for the present invention. They are as follows:

1. Mixed Bed Column System-The chelate resin and cation exchange resin are packed together in an ion exchange column and the resist component solution is passed through the column. Preferably, the resist component solution is passed at a constant rate and constant temperature to maximize absorption of the metal impurities onto the chelate and cation exchange resins.

2. Mixed Batch System-The chelate resin and cation exchange resin are mixed into the resist component solution to provide a resultant suspension. After a sufficient contacting time has passed, the chelate resin and cation exchange resin are removed, preferably by filtration, from the resist component solution. Preferably, it may be advantageous in some situation to disperse the chelate resin and cation exchange resin in a solvent before adding to the resist component solution. Further, it may be preferable to carry out the contacting in this mode at a constant temperature to maximize absorption onto the chelate and cation exchange resins.

3. Sequential Column System-The chelate resin is packed into one ion exchange column and the cation exchange resin is packed into a separate ion exchange column. The resist component solution is then passed through both columns in a sequential manner.

4. Sequential Batch System-In this mode, the resist component solution is mixed with either the chelate resin or cation exchange ion resin in a closed container and after a suitable contacting time, the chelate resin or cation exchange resin is separated, preferably by membrane filtration, from the resist component solution. Next, the partially treated resist component solution is contacted with the resin not used in the first system, and then that resin is separated from the resist component system.

The separation step (c) of the present invention necessarily occurs immediately after the contacting step (b) when the mixed bed column system or sequential column system is used. With the mixed batch system and sequential batch system, the separation step (c) requires an additional step by the operator.

After the contacting and separation steps, the thus treated resist component system has a reduced metal content of less than about 100 parts per billion (ppb) by weight. For example, the amount by weight of sodium and iron impurities may each range from only 100 ppb to 20 ppb or even lower.

It may be preferred to have other optional material contact the resist component solution besides the chelate resin and cation exchange resin. One preferred optional ingredient is an anion exchange resin. Such resins may be employed if there is a problem with an accompanying pH decrease or inefficient removal of metals. Suitable anion exchange resins include quaternary ammonium group-containing phenolic resins, quaternary ammonium group-containing styrene-divinyl benzene copolymers, aromatic polyamines, polyethyleneimine, and the like. One preferred particulate anionic exchange resin is a quaternary ammonium styrene-divinyl benzene resin called AMBERLYST A-27 and made by Rohm & Haas Company of Philadelphia, Pa. Another preferred particulate anionic exchange resin is an aliphatic amino group-containing styrene-divinyl benzene resin called AMBERLYST A-21 which is also produced by Rohm & Haas. Alternatively, fibrous anion exchange resins may also be used. Such resins have anion exchange groups such as primary amines, secondary amines, tertiary amines, quaternary ammonium salts and the like. One fibrous anion exchange resin is TIN-100 available from Toray Industries, Ltd. of Tokyo, Japan. It is a polystyrene/polyolefin composite resin having trimethylammonium groups introduced onto the polystyrene.

If the untreated resist component solution contains a significant amount of insoluble colloidal hydroxides or oxides, the resist component solution may be passed through a micro-pore membrane having a pore size of 0.1–0.5 microns prior to the contacting with the cation exchange resin and chelate resin. This filtration operation will remove at least a portion of the insoluble colloids and these make the contacting steps (b) more efficient.

The following Examples and Comparisons are given to further illustrate the present invention. All parts and percentages are by weight unless explicitly stated otherwise.

EXAMPLE 1

A mixed meta-/para-cresol novolak resin was made by reacting formaldehyde with a cresol mixture which was 40% m-cresol/60% p-cresol by moles in the feed. The molecular weight of the novolak resin was 6,500 as measured by GPC. This novolak (44.8 grams) was dissolved in a mixed solvent of ethyl lactate (EL) (90.0 grams) and ethyl-3-ethoxypropionate (EEP) (38.6 grams). This novolak solution was placed in a plastic bottle. A chelate resin[1] (3.5 grams) and a cation exchange[2] (3.5 grams) were then added to the bottle. Both the chelate resin and cation exchange resin were washed with ethyl lactate three times before use.

[1] DIANION CR-10 produced by Mitsubishi Kasei of Tokyo, Japan. This chelate resin is a cross-linked styrene-divinyl benzene copolymer having iminodiacetic acid side chain groups and which has an average 1.2 micron particle diameter.

[2] AMBERLYST 15 produced by Rohm & Haas Company of Philadelphia, Pa. This cation exchange resin is a styrene-divinyl benzene sulfonate copolymer.

The resultant suspension was rolled in a bottle roller for 24 hours. The chelate and cation exchange resin particles were then removed from the suspension by filtering the suspension through a membrane filter having 0.2 micron pore size.

The sodium and iron impurity contents in the novolak solution were measured before the addition of the chelate and cation exchange resins and after their removal by filtration. The sodium contents were determined by graphite furnace atomic absorption spectrometry. The results of these measurements are shown in Table 1 below.

EXAMPLE 2

The same novolak, EL, and EEP solution (173.4 grams) prepared for Example 1 were placed in a plastic bottle. The same chelate resin (3.5 grams) used in Example 1 was added to that novolak solution.

The resultant suspension was rolled by a bottle roller for 24 hours at room temperature. The chelate resin particles were removed from the suspension by filtering the suspension through a membrane filter having 0.2 micron pore size.

After this treatment, the same cation exchange resin (3.5 grams) employed in Example 1 was added to the novolak solution filtrate.

The resultant suspension was rolled in a bottle roller for another 24 hours at room temperature. The cation exchange resin particles were then removed from the suspension through a membrane filter having 0.2 micron pore size.

The chelate resin particles and cation exchange resin particles were both prewashed with ethyl lactate in the same manner as described in Example 1.

The sodium and iron impurity contents of the novolak solution were measured before the chelate resin treatment and after the cation exchange resin treatment by the same analytical techniques described in Example 1. The results of these measurements are given in Table 1 below.

EXAMPLE 3

The same novolak, EL, and EEP solution (173.4 grams) prepared for Example 1 were placed in a plastic bottle. A second type of chelate resin[3] (3.5 grams) as well as the same type of cation exchange resin (3.5 grams) employed in Example 1 were then added to the bottle. Both the chelate resin and cation exchange resin were prewashed with ethyl lactate in the same manner as described in Example 1.

[3] DIANION CR-20 produced by Mitsubishi Kasei of Tokyo, Japan. This chelate resin is a cross-linked styrene-divinyl benzene copolymer resin having polyamine functional chelating groups in the copolymer and has an average 1.2 micron particle diameter.

The resultant suspension was rolled in a bottle roller for 24 hours. The chelate and cation exchange resin particles were then removed from the suspension by filtering the suspension through a membrane filter having 0.2 micron pore size.

The sodium and iron impurity contents in the novolak solution were measured before the addition of the chelate and cation exchange resin particle and after their removal by filtration by the same analytical techniques described in Example 1. The results of these measurements are given in Table 1 below.

EXAMPLE 4

The same novolak, EL, and EEP solution (173.4 grams) prepared for Example 1 were placed in a plastic bottle. The DIANION CR-20 chelate resin employed in Example 3 (3.5 grams) was added to the bottle.

The resultant suspension was rolled in a bottle roller for 24 hours. The chelate resin particles were removed from the suspension by filtering the suspension through a membrane filter having 0.2 micron pore size.

After this treatment, the same cation exchange resin (3.5 grams) employed in Example 1 was added to the novolak solution filtrate.

The resultant filtrate was rolled in a bottle roller for another 24 hours at room temperature. The cation exchange particles were then removed from the suspension through a membrane filter having 0.2 micron pore size.

The chelate resin particles and cation exchange resin particles were both prewashed with ethyl lactate in the same manner as described in Example 1.

The sodium and iron impurity contents of the novolak solution were measured before the chelate resin treatment and after the cation exchange resin treatment by the same analytical techniques described in Example 1. The results of these measurements are given in Table 1 below.

COMPARISON 1

The same novolak, EL, and EEP solution (173.4 grams) prepared for Example 1 were placed in a plastic bottle. The cation exchange resin, AMBERLYST 15, (3.5 grams) employed in Examples 1–4 was added to the bottle.

The resultant suspension was rolled in a bottle roller for 24 hours. The cation exchange resin particles were then removed from the suspension by filtering the suspension through a membrane filter having 0.2 micron pore size.

The sodium and iron impurity contents in the novolak solution were measured before the addition of the cation exchange resin particles and after their removal by filtration by the same analytical techniques described in Example 1. The results of these measurements are given in Table 1 below.

COMPARISON 2

The same novolak, EL, and EEP solution (173.4 grams) prepared for Example 1 were placed in a plastic bottle. The chelate resin, DIANION CR-10, (3.5 grams) employed in Examples 1 and 2 was added to the bottle.

The resultant suspension was rolled in a bottle roller for 24 hours. The cation exchange resin particles were then removed from the suspension by filtering the suspension through a membrane filter having 0.2 micron pore size.

The sodium and iron impurity contents in the novolak solution were measured before the addition of the chelate resin particles and after their removal by filtration by the same analytical techniques described in Example 1. The results of these measurements are given in Table 1 below.

COMPARISON 3

The same novolak, EL, and EEP solution (173.4 grams) prepared for Example 1 were placed in a plastic bottle. The chelate resin, DIANION CR-20, (3.5 grams) employed in Examples 3 and 4 was added to the bottle.

The resultant suspension was rolled in a bottle roller for 24 hours. The cation exchange resin particles were then removed from the suspension by filtering the suspension through a membrane filter having 0.2 micron pore size.

The sodium and iron impurity contents in the novolak solution were measured before the addition of the chelate resin particles and after their removal by filtration by the same analytical techniques described in Example 1. The results of these measurements are given in Table 1 below.

TABLE 1

| | METAL ANALYSIS OF NOVOLAK | | | |
| --- | --- | --- | --- | --- |
| | Na (ppb) | | Fe (ppb) | |
| Experiment | Before | After | Before | After |
| Example 1 | 960 | 52 | 500 | 45 |
| Example 2 | 890 | 43 | 550 | 56 |
| Example 3 | 950 | 40 | 590 | 55 |
| Example 4 | 850 | 65 | 630 | 60 |
| Comparison 1 | 900 | 55 | 530 | 500 |
| Comparison 2 | 930 | 900 | 610 | 65 |
| Comparison 3 | 870 | 830 | 600 | 58 |

The following Examples and Comparison show the benefits of the present method when applied to a speed enhancer (i.e., TRISP-PA) or a photoactive compound backbone (7 PyOL):

COMPARISON 4

TRISP-PA/ACETONE SOLUTION CONTACTED WITH DIANION CR-10 CHELATERESIN ALONE

A 10% (w/w) solution of TRISP-PA in microelectronic grade acetone was microfiltered through an 0.2 micron filter membrane into a plastic bottle. 2% (w/w) DIANION CR-10 chelate resin was added to the filtered solution. The chelate resin was washed with acetone before use.

The resultant suspension was rolled on a bottle roller for 24 hours. The chelate resin particles were removed from the suspension by decantation.

The sodium and iron impurity contents in the TRISP-PA solution were measured before microfiltration, after microfiltration, and after decantation from the chelate resin. The sodium content was determined by flame or graphite furnace atomic absorption spectrometry. The iron content was determined by Inductively Coupled Plasma Atomic Absorption Spectrometry. The results of these measurements are shown in Table 2 below.

COMPARISON 5

TRISP-PA/ACETONE SOLUTION CONTACTED WITH DIANION CR-20 CHELATE RESIN ALONE

The same microfiltered 10% (w/w) solution of TRISP-PA prepared for Comparison 4 was placed in a plastic bottle. 2% (w/w) DIANION CR-20 chelate resin was added to the filtered solution. The chelate resin was washed with acetone before use.

The resultant suspension was rolled on a bottle roller for 24 hours. The chelate resin particles were removed from the suspension by decantation.

The sodium and iron impurity contents in the TRISP-PA solution were measured before microfiltration, after microfiltration, and after decantation from the chelate resin. The sodium content was determined by flame or graphite furnace atomic absorption spectrometry. The iron content was determined by Inductively Coupled Plasma Atomic Absorption Spectrometry. The results of these measurements are shown in Table 2 below.

EXAMPLE 5

TRISP-PA/ACETONE SOLUTION CONTACTED WITH DIANION CR-10 CHELATE RESIN AND RCP-22H CATION EXCHANGE RESIN

The same microfiltered 10% (w/w) solution of TRISP-PA prepared for Comparison 4 was placed in a plastic bottle. 2% (w/w) DIANION CR-10 chelate resin and 2% (w/w) RCP-22H[(4)] cation exchange resin were added to the filtered solution. The chelate resin and cation exchange resin were washed with acetone before use.

[(4)]RCP-22H produced by Mitsubishi Kasei of Tokyo, Japan. This cation exchange resin is a styrene sulfonic acid-divinyl benzene copolymer which is a highly porous cross-linked particulate resin.

The resultant suspension was rolled on a bottle roller for 24 hours. The chelate resin and cation exchange particles were removed from the suspension by decantation.

The sodium and iron impurity contents in the TRISP-PA solution were measured before microfiltration, after microfiltration, and after decantation from the chelate resin. The sodium content was determined by flame or graphite furnace atomic absorption spectrometry. The iron content was determined by Inductively Coupled Plasma Atomic Absorption Spectrometry. The results of these measurements are shown in Table 2 below.

EXAMPLE 6

TRISP-PA/ACETONE SOLUTION CONTACTED WITH DIANION CR-20 CHELATE RESIN AND RCP-22H CATION EXCHANGE RESIN

The same microfiltered 10% (w/w) solution of TRISP-PA prepared for Comparison 4 was placed in a plastic bottle. 2% (w/w) DIANION CR-20 chelate resin and 2% (w/w) RCP-22H[(4)] cation exchange resin were added to the filtered solution. The chelate resin and cation exchange resin were washed with acetone before use.

The resultant suspension was rolled on a bottle roller for 24 hours. The chelate resin and cation exchange particles were removed from the suspension by decantation.

The sodium and iron impurity contents in the TRISP-PA solution were measured before microfiltration, after microfiltration, and after decantation from the chelate resin. The sodium content was determined by flame or graphite furnace atomic absorption spectrometry. The iron content was determined by Inductively Coupled Plasma Atomic Absorption Spectrometry. The results of these measurements are shown in Table 2 below.

COMPARISON 6

7-PyOL/ACETONE SOLUTION CONTACTED WITH DIANION CR-10 CHELATE RESIN ALONE

A 10% (w/w) solution of 7-PyOL in microelectronic grade Acetone was microfiltered through an 0.2 micron filter membrane into a plastic bottle. 2% (w/w) DIANION CR-10 chelate resin was added to the filtered solution. The chelate resin was washed with acetone before use.

The resultant suspension was rolled on a bottle roller for 24 hours. The chelate resin particles were removed from the suspension by decantation.

The sodium and iron impurity contents in the 7-PyOL solution were measured before microfiltration, after microfiltration, and after decantation from the chelate resin. The sodium content was determined by flame or graphite furnace atomic absorption spectrometry. The iron content was determined by Inductively Coupled Plasma Atomic Absorption Spectrometry. The results of these measurements are shown in Table 2 below.

COMPARISON 7

7-PyOL/ACETONE SOLUTION CONTACTED WITH DIANION CR-20 CHELATE RESIN ALONE

The same microfiltered 10% (w/w) solution of 7-PyOL prepared for Comparison 6 was placed in a plastic bottle. 2% (w/w) DIANION CR-20 chelate resin was added to the filtered solution. The chelate resin was washed with acetone before use.

The resultant suspension was rolled on a bottle roller for 24 hours. The chelate resin particles were removed from the suspension by decantation.

The sodium and iron impurity contents in the 7-PyOL solution were measured before microfiltration, after microfiltration, and after decantation from the chelate resin. The sodium content was determined by flame or graphite furnace atomic absorption spectrometry. The iron content was determined by Inductively Coupled Plasma Atomic Absorption Spectrometry. The results of these measurements are shown in Table 2 below.

EXAMPLE 7

7-PyOL/ACETONE SOLUTION CONTACTED WITH DIANION CR-10 CHELATE RESIN AND RCP-22H CATION EXCHANGE RESIN

The same microfiltered 10% (w/w) solution of 7-PyOL prepared for Comparison 6 was placed in a plastic bottle. 2% (w/w) DIANION CR-10 chelate resin and 2% (w/w) RCP-22H[(4)] cation exchange resin were added to the filtered solution. The chelate resin and cation exchange resin were washed with acetone before use.

The resultant suspension was rolled on a bottle roller for 24 hours. The chelate resin and cation exchange resin particles were removed from the suspension by decantation.

The sodium and iron impurity contents in the 7-PyOL solution were measured before microfiltration, after microfiltration, and after decantation from the chelate resin. The sodium content was determined by flame atomic absorption spectrometry. The iron content was determined by Inductively Coupled Plasma Atomic Absorption Spectrometry. The results of these measurements are shown in Table 2 below.

EXAMPLE 8

7-PyOL/ACETONE SOLUTION CONTACTED WITH DIANION CR-20 CHELATE RESIN AND RCP-22H CATION EXCHANGE RESIN

The same microfiltered 10% (w/w) solution of 7-PyOL prepared for Comparison 6 was placed in a plastic bottle. 2% (w/w) DIANION CR-20 chelate resin and 2% (w/w) RCP-22H[(4)] cation exchange resin were added to the filtered solution. The chelate resin and cation exchange resin were washed with acetone before use.

The resultant suspension was rolled on a bottle roller for 24 hours. The chelate resin and cation exchange resin particles were removed from the suspension by decantation.

The sodium and iron impurity contents in the 7-PyOL solution were measured before microfiltration, after microfiltration, and after decantation from the chelate resin. The sodium content was determined by flame or graphite furnace atomic absorption spectrometry. The iron content was determined by Inductively Coupled Plasma Atomic Absorption Spectrometry. The results of these measurements are shown in Table 2 below.

TABLE 2

| | Na (ppb) | | | Fe (ppb) | | |
|---|---|---|---|---|---|---|
| Experiment | Before Micro | After Micro | After Decant | Before Micro | After Micro | After Decant |
| Comparison 4 | 1500 | 50 | 1500 | 809 | 53 | 53 |
| Comparison 5 | 1500 | 50 | 809 | 809 | 53 | 26 |
| Example 5 | 1500 | 50 | <10 | 809 | 53 | 35 |
| Example 6 | 1500 | 50 | <10 | 809 | 53 | 35 |
| Comparison 6 | 1180 | 700 | 6000 | 1736 | 531 | 400 |
| Comparison 7 | 1180 | 700 | 1000 | 1736 | 531 | 333 |
| Example 7 | 1180 | 700 | 7 | 1736 | 531 | 39 |
| Example 8 | 1180 | 700 | 7 | 1736 | 531 | 39 |

EXAMPLE 9

A cation exchange resin[(2)] (10 grams) was washed with an aqueous solution containing 25% by weight tetramethylammonium hydroxide (TMAH) (100 grams). The washing was carried out by suspending the cation exchange resin in the TMAH solution in a plastic bottle. The bottle was rolled in a bottle roller for 30–40 minutes at room temperature. Next, the resin particles were separated by decanting the TMAH solution. The resin particles were resuspended in the same TMAH solution. This decanting and resuspension was repeated twice more to completely wash the particles. The particles were finally collected by a final decantion of the TMAH.

A mixed meta-/para-cresol novolak resin (60% m-cresol/40% p-cresol by moles in feed) similar to that employed in Example 1 was dissolved in a straight ethyl lactate solution. The resulting solids content was 30% by weight.

The prewashed cation exchange resin was added to the novolak resin solution. The amount of cation exchange resin added was 2% by weight of the solution. The resultant suspension was rolled on a bottle roller for 24 hours at room temperature. The cation exchange resin was removed by filtration with a membrane filter have 0.2 microns pore size.

The sodium content in the novolak was determined by graphite furnace atomic absorption spectrometry. A pH measurement was done after the dilution of the above-treated novolak/ethyl lactate solution with deionized water to set a volume ratio of ethyl lactate to water at 60/40. This dilution was necessary to obtain a stable pH reading. The results of these analyses are shown in Table 3 below.

COMPARISON 8

The procedure of Example 9 was repeated except that the cation exchange resin washed with ethyl lactate (100 grams) instead of the aqueous solution of TMAH. The sodium and pH levels were measured according to the same methods described in Example 7. The results are shown in Table 3.

TABLE 3

COMPARISON OF TMAH TREATED AND ETHYL LACTATE TREATED CATION ION EXCHANGE RESIN IN TERMS OF CHANGES IN SODIUM AND pH LEVELS IN NOVOLAK SOLUTION

| | Na (ppb) | | pH (ppb) | |
|---|---|---|---|---|
| Experiment | Before | After | Before | After |
| Example 9 | 670 | 45 | 3.6 | 3.4 |
| Comparison 8 | 670 | 39 | 3.6 | 2.4 |

The data in this table indicates that prewashing a cationic exchange resin solution with TMAH will not adversely lower the pH of the resin solution, yet still remove substantially the same amount of sodium impurities.

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims. All patent applications, patents, and other publications cited herein are incorporated by reference in their entirety.

What is claimed is:

1. A method of removing metal impurities from a resist component comprising the steps of:
   (a) dissolving said resist component in a solvent;
   (b) contacting said resist component solution with a cation exchange resin and a chelate resin, for a sufficient amount of time to absorb at least a portion of said metal impurities onto said cation exchange resin and said chelate resin, wherein said cation exchange resin and, optionally said chelate resin, are prewashed with a solution of a quaternary ammonium salt compound and wherein the weight ratio of said chelate resin to said cation exchange resin is from about 9:1 to 1:9; and
   (c) separating said cation exchange resin and said chelate resin bearing said metal impurities from said resist component solution.

2. The method of claim 1 wherein said resist component solution is contacted simultaneously with said cation exchange resin and said chelate resin.

3. The method of claim 1 wherein said resist component solution is contacted sequentially with said cation exchange resin and said chelate resin.

4. The method of claim 1 wherein said solvent comprises ethyl lactate, ethyl-3-ethoxy propionate and mixtures thereof.

5. The method of claim 1 wherein said metal impurities comprise a mixture of sodium and iron.

6. The method of claim 1 wherein said separating step is filtration.

7. The method of claim 1 wherein said contacting step (b) is sufficient to cause said resist component solution to contain less than 100 ppb each of sodium and iron after said metal separation step (c).

8. The method of claim 1 wherein said resist component is a novolak resin.

9. The method of claim 1 wherein said quaternary ammonium salt compound is a tetra-alkyl ammonium hydroxide.

10. The method of claim 1 wherein the mode of contacting comprises adding said cation exchange resin and said chelate resin to said resist component solution.

11. The method of claim 1 wherein said contacting and separating steps comprise passing said resist component solution through at least one ion exchange column or bed containing said cation exchange resin and said chelate resin.

12. The method of claim 1 wherein said chelate resin has polyamine chelating groups.

13. The method of claim 1 wherein said cation exchange resin is a fibrous cation exchange resin.

14. The method of claim 1 wherein said quaternary ammonium salt compound is a polymeric quaternary ammonium salt compound.

15. A method of removing metal impurities from a novolak resin, comprising the steps of:
(a) dissolving said novolak resin in a solvent;
(b) contacting said novolak resin solution with an admixture of at least one cation exchange resin and at least one chelate resin for sufficient amount of time to transfer at least a major portion of said metal impurities onto said cation exchange resin and said chelate resin, wherein said cation exchange resin and, optionally said chelate resin are prewashed with a solution of a quaternary ammonium salt compound and wherein the weight ratio of said chelate resin to said cation exchange resin is from about 9:1 to 1:9; and
(c) separating said cation exchange and chelate resins bearing said metal impurities from said novolak resin solution.

16. The method of claim 15 wherein said contacting is carried out by adding said admixture of cation exchange and chelate resins to said novolak resin solution.

17. The method of claim 15 wherein said contacting and separating steps are carried out by passing said novolak resin solution through at least one ion exchange column or bed comprising an admixture of cation exchange and chelate resins.

18. The method of claim 15 wherein said quaternary ammonium salt compound is tetramethyl ammonium hydroxide.

19. The method of claim 15 wherein said chelate resin has polyamine chelating groups.

20. The method of claim 15 wherein said cationic exchange resin is a fibrous cation exchange resin.

21. The method of claim 15 wherein said quaternary ammonium salt compound is apolymeric quaternary ammonium salt compound.

* * * * *